United States Patent [19]

Jüntgen et al.

[11] 4,058,374

[45] Nov. 15, 1977

[54] METHOD OF REGENERATING PARTICULATE ADSORPTION AGENTS

[75] Inventors: Harald Jüntgen, Essen-Heisingen; Jürgen Klein, Essen; Günther Gappa, Gelsenkirchen-Buer, all of Germany

[73] Assignee: Bergwerksverband GmbH, Essen, Germany

[21] Appl. No.: 694,521

[22] Filed: June 10, 1976

Related U.S. Application Data

[63] Continuation-in-part of Ser. No. 657,406, Feb. 12, 1976, Pat. No. 4,017,422.

[30] Foreign Application Priority Data

June 14, 1975 Germany .............................. 2526714

[51] Int. Cl.² .................... B01D 53/08; B01D 53/12
[52] U.S. Cl. ..................................... 55/60; 55/79; 252/417; 252/418
[58] Field of Search .................. 23/277 C; 55/34, 60, 55/61, 62, 77, 79, 99, 181, 208, 390; 201/31; 210/33, 80, 189, 269, 270; 252/416, 417, 418, 420, 445

[56] References Cited

U.S. PATENT DOCUMENTS

| | | | |
|---|---|---|---|
| 2,419,245 | 4/1947 | Arveson | 252/417 |
| 2,766,185 | 10/1956 | Pansing | 252/417 X |
| 2,851,428 | 9/1958 | Wayne et al. | 252/417 |

FOREIGN PATENT DOCUMENTS

| | | | |
|---|---|---|---|
| 971,417 | 1/1959 | Germany | 55/390 |

*Primary Examiner*—Thomas G. Wyse
*Assistant Examiner*—Robert H. Spitzer
*Attorney, Agent, or Firm*—Michael J. Striker

[57] ABSTRACT

An apparatus for performing the method of the invention for the thermal regeneration of contaminated particulate adsorption agents in a fluidized state includes a regeneration chamber which has separate first and second zones for the thermal treatment of the adsorption agents in a fluidized state. A first inlet is provided for admitting contaminated adsorption agents into the first zone and a separate second inlet is provided for admitting contaminated adsorption agents into the second zone. A first outlet is provided for removing regenerated adsorption agents from the first zone whereas a separate second outlet is provided for removing regenerated adsorption agents from the second zone. Means for fluidizing and thermally treating the contaminated adsorption agents so as to regenerate the same includes a combustion chamber arranged to supply hot fluidizing gases to both of the treatment zones. A gas outlet in the regeneration chamber serves to exhaust the fluidizing gases from both of the treatment zones.

5 Claims, 4 Drawing Figures

METHOD OF REGENERATING PARTICULATE ADSORPTION AGENTS

CROSS-REFERENCE TO RELATED APPLICATION

This application is a continuation-in-part of application Ser. No. 657,406 filed Feb. 12, 1976, now U.S. Pat. No. 4,017,422.

BACKGROUND OF THE INVENTION

The invention relates generally to adsorption methods.

Of particular interest to the invention are methods for the regeneration of contaminated adsorption agents.

The invention is especially concerned with the simultaneous thermal regeneration in fluidized state of contaminated particulate adsorption agents of different type and/or of different particle size, particularly adsorption agents which have been contaminated or loaded with waste water components.

Organic substances are removed from waste water by means of adsorption agents such as, for example, activated carbon, aluminum oxide and silica gel. Generally, waste water does not contain just one type of substance or just one class of substances. Rather, waste water contains complex mixtures of numerous substances. It has been found that, as a result of this, a single adsorption agent does not, as a rule, suffice for the complete adsorption of the organic substances from waste water.

On the other hand, it is possible to achieve a high degree of purification using more than one adsorption agent, e.g., by using adsorption agents such as aluminum oxide and activated carbon having polar and nonpolar surfaces. A further alternative is to provide a plurality of purification stages arranged in series and to use the same adsorption agent, e.g., activated carbon, in each stage but with different particle sizes.

The thermal regeneration of contaminated adsorption agents has heretofore been carried out mainly in multistage ovens or rotating tubular ovens. Here, the adsorption agents continuously pass through the regenerating ovens. The regenerating ovens must not only be capable of treating the adsorption agents in a gentle fashion but must be designed so as to permit achievement of good heat and material transfer characteristics, as well as short dwell times.

A substantial improvement in the heat and material transfer characteristics achievable with multistage or rotating tubular ovens is made possible by the use of a fluidized bed reactor or oven.

Thus, it has become known to carry out the thermal regeneration of adsorption agents such as, for instance, activated carbon, in fluidized bed reactors having a plurality of individual fluidized beds arranged one above the other. Here, the fluidizing gases, as well as the vaporizing or gasifying agents, are conveyed in countercurrent to the adsorption agent to be regenerated. The adsorption agent continuously passes through the multistage fluidized bed reactor from top to bottom.

Although this multistage fluidized bed reactor possesses the advantages mentioned above, namely, improved heat and material transfer characteristics, it nevertheless simultaneously possesses several rather severe disadvantages. For instance, a relatively large reaction volume is required. Moreover, the individual stages must be connected with one another via the pipes through which the adsorption agent travels downwardly from a given stage to the next lower stage after having passed over an overflow weir (German Pat. No. 951,864).

Further known is an elongated, rectangular fluidized bed reactor provided with a foraminous wall through which a flow of gas takes place. Here, perpendicularly arranged baffles which form, or which are formed with, flow restrictions are positioned above the foraminous wall and extend transversely to the direction of travel of the solid particles being treated. The flow restrictions may be formed by openings provided in the perpendicularly arranged baffles. This construction is intended to achieve a uniform treatment of the individual solid particles during an operation such as, for example, activation of carbonaceous substances with water vapor or activating gases at red heat temperatures (German Pat. No. 971,417).

However, constructions of this type have been found in practice not to be suitable for the regeneration of activated carbon since a portion of the activated carbon particles become overactivated thereby resulting in a loss of activated carbon.

SUMMARY OF THE INVENTION

It is an object of the invention to provide an improved method for the regeneration of adsorption agents.

Another object of the invention is to provide for a substantial simplification in the regeneration of particulate adsorption agents in fluidized bed reactors for adsorption processes which operate with adsorption agents of different type and/or of different particle size accommodated in series-arranged purification stages.

These objects, as well as others which will become apparent as the description proceeds, are achieved in accordance with the invention. One aspect of the invention relates to an apparatus or fluidized bed reactor for the thermal regeneration of contaminated particulate adsorption agents in a fluidized state. The apparatus comprises a regeneration chamber having separate first and second zones for the thermal treatment of contaminated particulate adsorption agents in a fluidized state so as to regenerate the adsorption agents. Inlet means is provided for the admission of the contaminated adsorption agents into the zones. Outlet means is provided for the removal of the regenerated adsorption agents from the zones. The apparatus further includes means for fluidizing and thermally treating the contaminated adsorption agents and this fluidizing and treating means comprises a combustion chamber arranged to supply hot fluidizing gases to both the first and second zones. A gas outlet is provided in the regeneration chamber for exhausting the fluidizing gases from both the first and second zones.

According to one advantageous embodiment of the invention, the inlet means includes a first inlet for the admission of contaminated adsorption agents into the first treatment zone and a separate, substantially independent second inlet for the admission of contaminated adsorption agents into the second treatment zone.

A further favorable embodiment of the invention contemplates for the outlet means to include a first outlet for the removal of regenerated adsorption agents from the first treatment zone and a separate, substantially independent second outlet for the removal of regenerated adsorption agents from the second treatment zone.

Another aspect of the invention relates to a method of regenerating contaminated particulate adsorption agents. The method comprises admitting a first quantity of contaminated particulate adsorption agent into a first regeneration zone, and a second quantity of contaminated adsorption agent into a separate second regeneration zone arranged in a common chamber with the first regeneration zone. The first and second quantities of adsorption agents are fluidized and regenerated by supplying hot gases to the first and second zones from a common combustion zone. The regenerated first and second quantities of adsorption agents are withdrawn from the first and second zones and the fluidizing and regenerating gases are exhausted from the chamber for the first and second zones via a common outlet.

In accordance with one favorable embodiment of the method, the admission of the first quantity of adsorption agent into the first regeneration zone is effected separately from and substantially independently of the admission of the second quantity of adsorption agent into the second regeneration zone.

Another advantageous embodiment of the method contemplates for the withdrawal of the regenerated first quantity of adsorption agent from the first regeneration zone to be effected separately from and substantially independently of the withdrawal of the regenerated second quantity of adsorption agent from the second regeneration zone.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
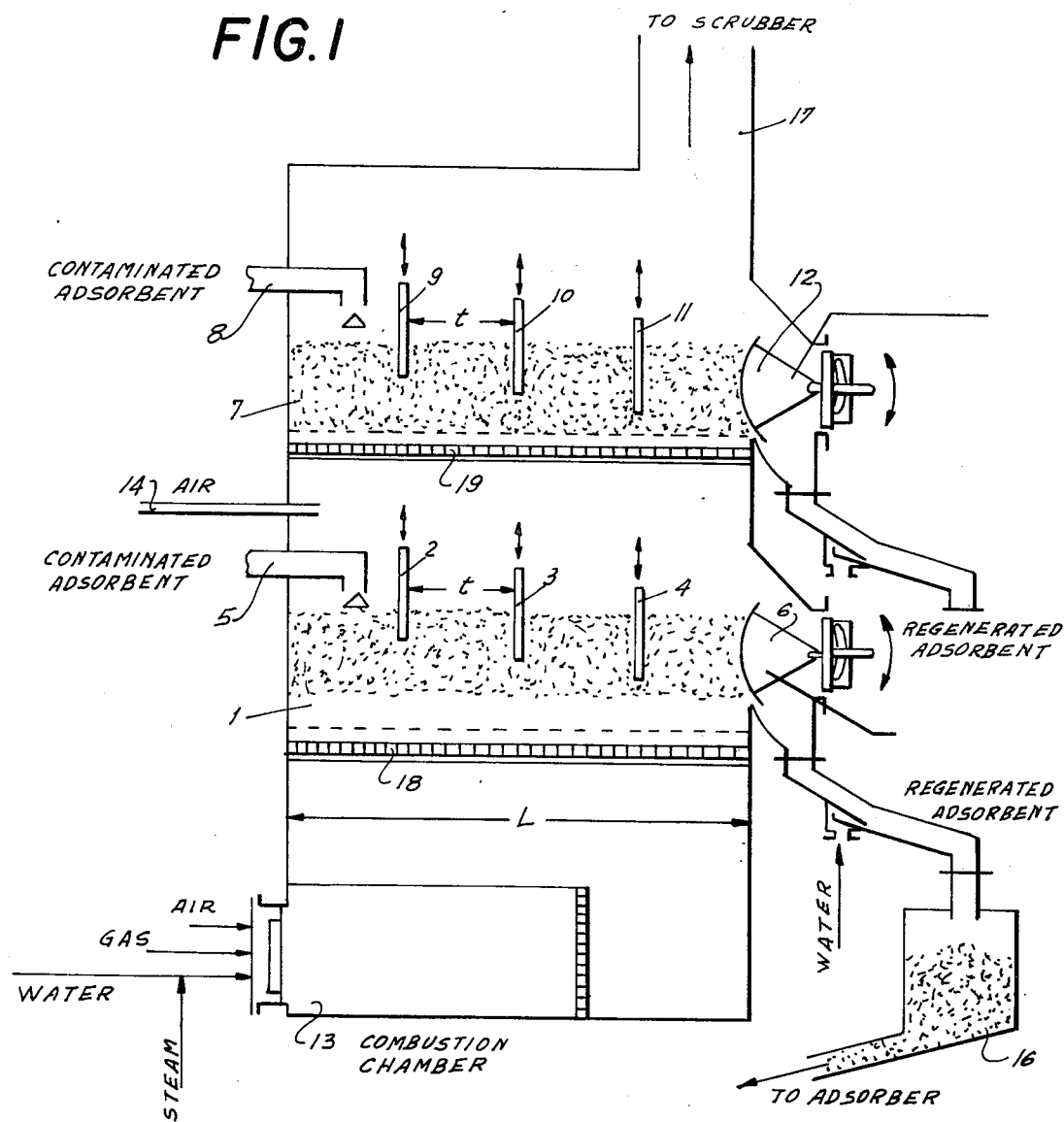
FIG. 1 schematically represents a longitudinal section through one embodiment of a fluidized bed reactor in accordance with the invention.

In a preferred aspect, the invention is concerned with the simultaneous thermal regeneration in fluidized state of particulate adsorption agents of different type and/or of different particle size, especially adsorption agents which have been contaminated or loaded with waste water components.

The preferred embodiments of the invention contemplate carrying out the thermal regeneration by heating the adsorption agents in separate fluidized beds using fluidizing gases which contain vaporizing or gasifying agents. Air or oxygen may also be supplied to the fluidized beds where appropriate or desirable.

Favorably, the thermal regeneration is effected in an elongated fluidized bed reactor of substantially rectangular or square cross-sectional configuration having a ratio of length to width which is greater than about 2. The fluidized bed reactor may be provided with baffles which define, that is, which are formed with or which form, flow restrictions and which are arranged in one or more of the fluidized beds and extend transversely to the direction of travel of the adsorption agent particles being regenerated.

It is advantageous for the fluidized bed reactor to be provided with baffles such as disclosed in the earlier-referenced commonly owned prior application Ser. No. 657,406 filed Feb. 12, 1976 and the contents of which are incorporated herein by reference. Briefly, this prior application discloses baffles which are mounted for sliding movement in the vertical direction and which are arranged to be immersed in a fluidized bed from above the latter.

In one of its aspects, the invention achieves its objects in that the fluidized beds are arranged separately from one another in a common fluidized bed reactor. The fluidized beds may be arranged side-by-side or one above the other. Each fluidized bed is provided with an autonomous and separate inlet for the adsorption agent or agents as well as an autonomous and separate outlet for the adsorption agent or agents. On the other hand, a common combustion chamber is provided for the generation of the fluidizing gases and, further, a common discharging device is provided for the waste gases from the fluidized beds.

One or more foraminous walls may be provided intermediate the combustion chamber and the zones in which the fluidized beds are formed so as to permit the fluidizing gases to travel from the combustion chamber to these zones. If the fluidized beds are arranged one above the other, a foraminous wall may be provided below each of the fluidizing zones or fluidized beds. On the other hand, a single foraminous wall may be provided intermediate the combustion chamber and the fluidized beds if the latter are arranged side-by-side.

As just mentioned, the fluidized beds may be arranged one above the other with a foraminous wall positioned below each fluidized bed. In the event that two different adsorption agents are to be regenerated of which one undergoes regeneration at higher temperatures and with the absorption of heat, e.g., the regeneration of activated carbon with water vapor, whereas the other undergoes regeneration at lower temperatures and with the liberation of heat, e.g., the regeneration of aluminum oxide with air, it is advantageous to carry out the regeneration which occurs at higher temperatures in the lower of two fluidized beds and to carry out the regeneration which occurs at lower temperatures in the upper fluidized bed. Here, it is further found to be of advantage when the oxygen which may be required is admitted immediately below the foraminous wall for the upper fluidized bed, that is, the upper foraminous wall, in the form of air or substantially pure oxygen.

In the case of an adsorption process utilizing only a single adsorption agent but wherein different particle sizes of this adsorption agent are used, it is favorable to make use of fluidized beds which are arranged side-by-side. Thus, in accordance with the invention, it is possible to divide the foraminous wall located above the combustion chamber into two separate sections by means of a vertical wall which extends from the inlet for the adsorption agent to the outlet therefor. In other words, it is possible to arrange a vertical wall which extends from the inlet for the adsorption agent to the outlet therefor above the foraminous wall provided above the combustion chamber and thereby form two separate channels for fluidized beds.

After flowing through the individual fluidized beds, the fluidizing gases or, more precisely, the gases resulting from reaction of the fluidizing gases, are collected and subjected to an aftertreatment together, that is, the fluidizing gases from the different fluidized beds are aftertreated together.

A particular advantage of a fluidized bed reactor in accordance with the invention resides in that the regeneration of different adsorption agents, that is, adsorption agents of different type and/or of different particle size, may be effected with a combination chamber for the generation of the fluidizing gases which is common to the different fluidized beds and in that the waste fluidizing gases may be aftertreated together. In this manner, the regeneration of adsorption agents may be carried out in a compact installation which requires less room than separate fluidized bed reactors and, further, the regeneration may be carried out with a substantial reduction in energy losses as opposed to a regeneration effected in separate fluidized bed reactors.

The fluidized bed reactor in accordance with the invention, as well as the operation thereof, will now be described with reference to the drawings.

Figure 2:
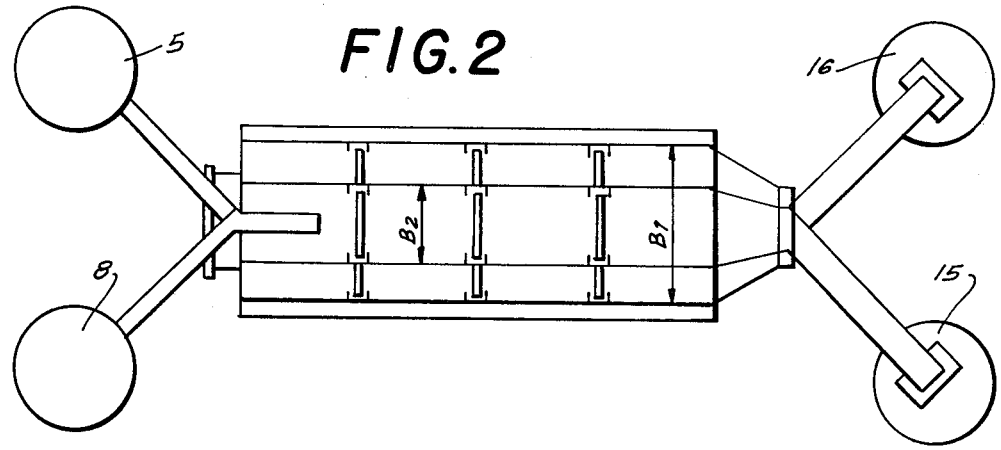
FIG. 2 is a plan view of the fluidized bed reactor of FIG. 1.

FIGS. 1 and 2 schematically illustrate a two-level fluidized bed reactor according to the invention.

In the embodiment of FIGS. 1 and 2, a wet adsorption agent to be regenerated is admitted into a fluidized bed 1 via a dosing device 5. The fluidized bed 1 has a width "$B_1$" and a length "L." The adsorption agent admitted into the fluidized bed 1 is here assumed to be activated carbon. After traveling through the fluidized bed 1, the activated carbon passes by a vertically adjustable weir 6 and is discharged from the fluidized bed 1 in a regenerated form.

Three baffles 2, 3 and 4 extending into the fluidized bed 1 are arranged at intervals along the length "L" of the latter and interrupt the direct path of travel of the activated carbon from the dosing device 5 to the weir 6. In the present instance, the baffles 2, 3 and 4 are separated from one another by a distance "t." The depth to which the baffles 2, 3 and 4 are immersed in the fluidized bed 1 increases in a direction towards the weir 6, that is, the baffle 2 is least deeply immersed in the fluidized bed 1 whereas the baffle 4 is most deeply immersed in the fluidized bed 1. The baffles 2, 3 and 4 may favorably be mounted in a manner such as disclosed in the earlier-referenced commonly owned application Ser. No. 657,406 filed Feb. 12, 1976, namely, so as to be vertically displaceable.

The regenerated activated carbon is admitted into a container 16 and cooled therein with water. From the container 16, the activated carbon is hydraulically conveyed to an adsorption reactor.

The fluidized bed 1 constitutes a lower fluidized bed in that another fluidized bed 7 is provided thereabove.

A wet adsorption agent to be regenerated is admitted into the fluidized bed 7 via a dosing device 8. The fluidized bed 7 has a width "$B_2$" and a length "L." The adsorption agent admitted into the fluidized bed 7 is here assumed to be an inorganic adsorption agent such as, for example, aluminum oxide. After travelling through the fluidized bed 7, the inorganic adsorption agent passes by a vertically adjustable weir 12 and is discharged from the fluidized bed 7 in a regenerated form.

Three baffles 9, 10 and 11 extend into the fluidized bed 7 and are arranged at intervals along the length "L" thereof. In the present case, the baffles 9, 10 and 11 are again separated from one another by a distance "t." The depth to which the baffles 9, 10 and 11 are immersed in the fluidized bed 7 increases in a direction towards the weir 12 and the baffles 9, 10 and 11 may again favorably be mounted so as to be vertically displaceable. The regenerated inorganic adsorption agent from the fluidized bed 7 is admitted into a container 15 and cooled therein with water. From the container 15, the inorganic adsorption agent is hydraulically conveyed to an adsorption reactor.

A foraminous wall 18 is arranged below the fluidized bed 1 whereas a foraminous wall 19 is arranged below the fluidized bed 7. The fluidizing gas required for the two fluidized beds 1 and 7 is generated in a combustion chamber 13 and ascends to the fluidized beds 1 and 7 via the foraminous walls 18 and 19. The fluidizing gas required to form and maintain the fluidized beds 1 and 7 via the foraminous walls 18 and 19 may be generated in the combustion chamber 13 by the stoichiometric combustion of city gas while adding water. The fluidizing gas from both the fluidized bed 1 and the fluidized bed 7 is exhausted from the fluidized bed reactor through the same exhaust stack 17. The thus-exhausted fluidizing gas may be subjected to a scrubbing operation so as to free it of undesirable components.

The air required for the regeneration of the inorganic adsorption agent in the fluidized bed 7 is admitted into the fluidized bed reactor below the upper foraminous wall 19 via a conduit 14.

The operation of the two-level fluidized bed reactor in accordance with the invention will be further illustrated by an Example which is not intended to limit the invention in any manner:

EXAMPLE 1

180 cubic meters per hour of cellulose waste water is to be purified. The waste water has a TOC (total organic carbon) content of 450 grams per cubic meter. Two separate, series-arranged adsorbers are used for the purification of the waste water and respectively require 400 kilograms per hour of aluminum oxide having a particle size of 1.5 to 2.5 millimeters and 200 kilograms per hour of activated carbon having a particle size of 1.5 to 2 millimeters.

The regeneration of the activated carbon is effected in a fluidized bed having a length of 3.2 meters and a width of 0.8 meter. Three baffles are arranged in the fluidized bed and are spaced from one another by a distance of 0.8 meter. The baffles are arranged in such a manner that, as considered in a direction from the activated carbon inlet to the activated carbon outlet, the free space beneath the baffles equals 60 percent, 50 percent and 40 percent of the height of the bed of fluidized activated carbon, respectively.

The regeneration of the aluminum oxide is effected in a fluidized bed arranged above that for the activated carbon. The aluminum oxide fluidized bed has a length of 3.20 meters and a width of 0.4 meter. As in the activated carbon fluidized bed, three baffles are arranged in the aluminum oxide fluidized bed. The baffles in the aluminum oxide fluidized bed are immersed to the same depths as those in the activated carbon fluidized bed.

2400 normal cubic meters per hour of oxygen-free reaction gas containing 55 percent by volume of water vapor is generated in a combustion chamber and utilized as fluidizing gas. The temperature below the lower foraminous wall, that is, the foraminous wall beneath the activated carbon fluidized bed, is 1100° C. The fluidizing gas leaves the first fluidized bed, that is, the activated carbon fluidized bed, at a temperature of 800° C and is cooled to a temperature of 600° C by the addition of 1300 normal cubic meters per hour of air. The fluidizing gas then flows through the upper fluidized bed, that is, the aluminum oxide fluidized bed, without any substantial change in temperature. The waste fluidizing gas is subsequently cooled and freed of HCl and $SO_2$ by a scrubbing operation.

Figure 3:
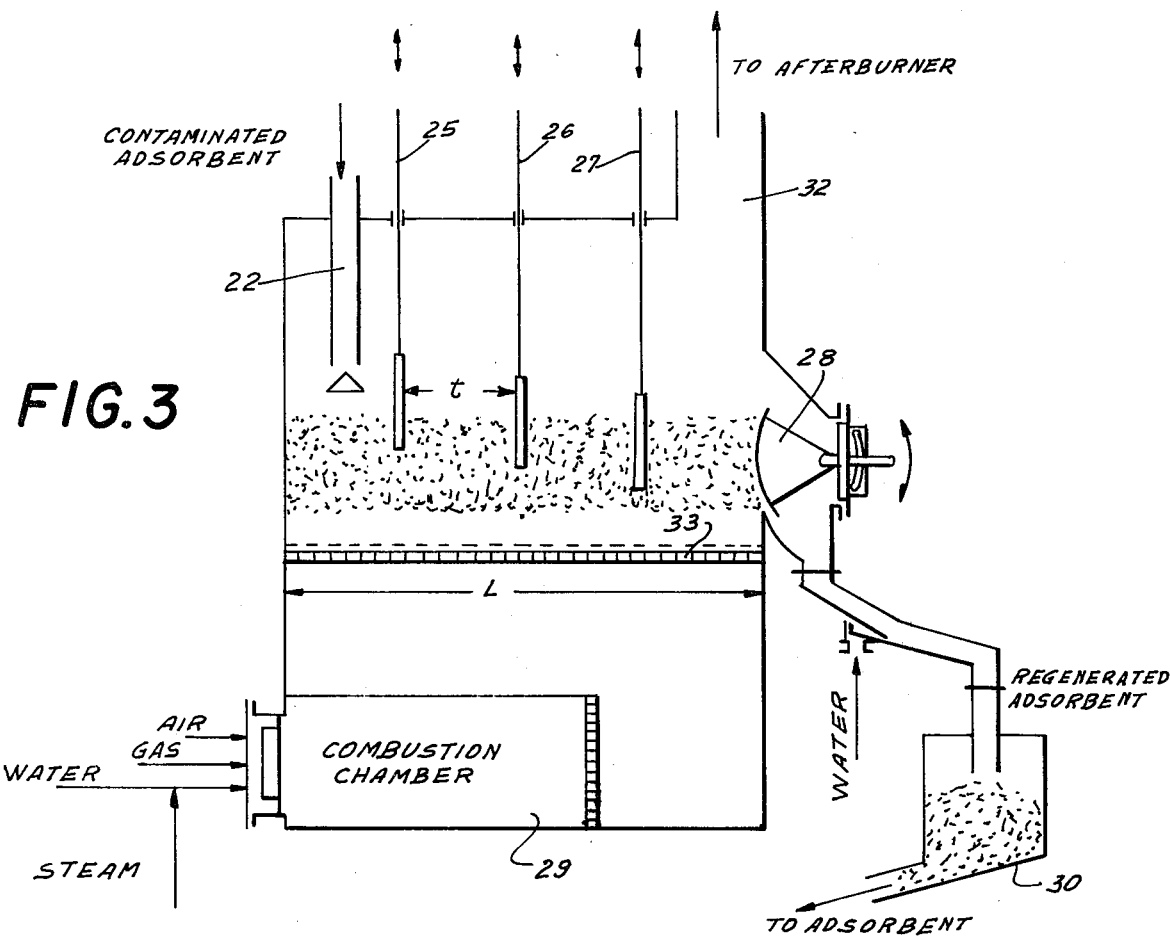
FIG. 3 schematically represents a longitudinal section through another embodiment of a fluidized bed reactor according to the invention.
Figure 4:
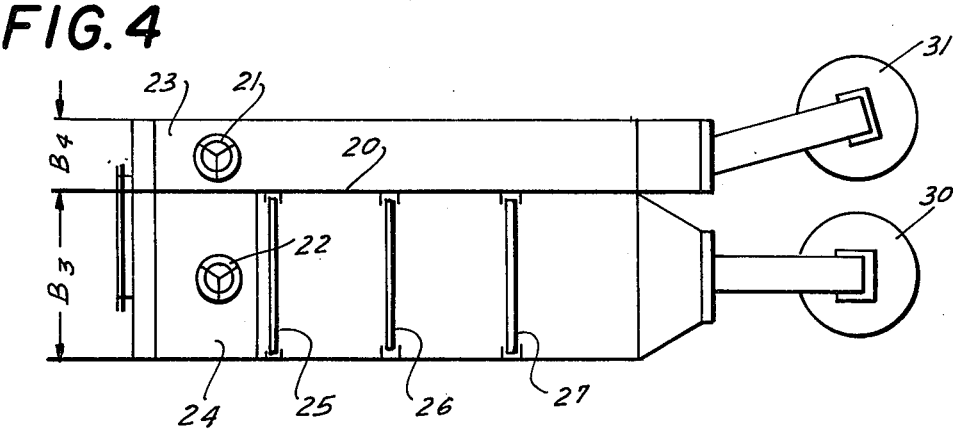
FIG. 4 is a plan view of the fluidized bed reactor of FIG. 3.

FIGS. 3 and 4 schematically illustrate a subdivided, single-level fluidized bed reactor in accordance with the invention.

The embodiment of FIGS. 3 and 4 includes a fluidized bed 24 having a width "$B_3$" and a length "L" as well as a fluidized bed 23 having the length "L" and a width "$B_4$" smaller than the width "$B_3$." The fluidized beds 23 and 24 are arranged side-by-side or next to one another and are separated from one another by a dividing wall 20.

The wet adsorption agent to be regenerated in the wider fluidized bed 24 is admitted into the latter via a charging arrangement 22. The adsorption agent admitted into the fluidized bed 24 is here assumed to be activated carbon having a relatively coarse particle size. After travelling through the fluidized bed 24, the activated carbon passes by a vertically adjustable weir 28 and is discharged from the fluidized bed 24 in a regenerated form.

Three baffles 25, 26 and 27 extending into the fluidized bed 24 are distributed along the length "L" of the latter and interrupt the direct path of travel of the activated carbon from the charging arrangement 22 to the weir 28 through the fluidized bed 24. In the present instance, the baffles 25, 26 and 27 are again separated from one another by the distance "t." The baffles 25, 26 and 27 may favorably be mounted so as to be vertically displaceable.

The regenerated activated carbon from the fluidized bed 24 is admitted into a container 30 and cooled therein with water. From the container 30, the activated carbon is hydraulically conveyed to an adsorption reactor.

An adsorption agent to be regenerated in the narrower fluidized bed 23 is admitted into the latter via a charging arrangement 21 and, in a similar manner as before, is discharged at the other end of the fluidized bed 23 in a regenerated form after passing through a non-illustrated outlet opening. The adsorption agent admitted into the fluidized bed 23 is here assumed to be activated carbon having a smaller particle size than the activated carbon admitted into the fluidized bed 24.

The fluidized bed 23 is here shown without any baffles immersed therein. However, it will be understood that one or more baffles may also be provided for immersion in the fluidized bed 23.

The non-illustrated outlet opening for the fluidized bed 23 is connected with a container 31 into which the regenerated activated carbon from the fluidized bed 23 is conveyed and in which it is cooled with water. From the container 31, the activated carbon is hydraulically conveyed to an adsorption reactor.

It will be noted that the dividing wall 20 separating the fluidized beds 23 and 24 extends from the inlets for the activated carbon to the outlets therefor.

A foraminous wall 33 is arranged below the fluidized beds 23 and 24. The fluidizing gas required for the two fluidized beds 23 and 24 is generated in a combustion chamber 29 common to both fluidized beds 23 and 24 and ascends to the latter via the foraminous wall 33. The fluidizing gas from both the fluidized bed 23 and the fluidized bed 24 is exhausted from the fluidized bed reactor through the same exhaust stack 32. The thus-exchanged fluidizing gas may be afterburned.

The operation of the single-level fluidized bed reactor according to the invention will now be further illustrated by an Example which is not intended to limit the invention in any manner:

EXAMPLE 2

30 cubic meters per hour of coking waste water having a phenol content of 1100 grams per cubic meter is to be purified. The purification is carried out in two separate, series-arranged adsorbers which respectively require 250 kilograms per hour of activated carbon having a particle size of 1.5 to 2.0 millimeters and 60 kilograms per hour of activated carbon having a particle size of 0.5 to 0.8 millimeters.

The regeneration of the activated carbon having the larger particle size is effected in a fluidized bed having a length of 2.8 meters and a width of 0.55 meter. The regeneration of the activated carbon having the smaller particle size is effected in a fluidized bed having a length of 2.8 meters and a width of 0.15 meter.

1500 normal cubic meters per hour of oxygen-free fluidizing gas having a temperature of 1100° C is generated in a combustion chamber common to both fluidized beds. The fluidizing gas is divided between the two fluidized beds in accordance with the different free flow cross-sections existing below the respective fluidized beds in the foraminous wall arranged beneath the fluidized beds. The fluidizing gas is divided between the two fluidized beds in such a manner that 100 normal cubic meters per hour enters the narrower fluidized bed whereas the remainder, namely, 1400 normal cubic meters per hour, enters the wider fluidized bed. The waste fluidized gas from the two fluidized beds is combined and then afterburned.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of regenerating at least two contaminated particulate adsorption agents of different properties, comprising the steps of admitting a first quantity of one of the different adsorption agents into a first regeneration zone, and a second quantity of the other of the different adsorption agents into a separate second regeneration zone arranged in a common regeneration chamber with the first regeneration zone; passing hot regenerating gases through the first and second quantities of the one and other adsorption agent present in the first and second separate regeneration zones, respectively, to fluidize and regenerate the different contaminated adsorption agents; removing the regenerated first and second quantities from the respective regeneration zones; and discharging the gases from the regeneration chamber upon passage thereof through the first and second quantities of the different adsorption agents.

2. The method of claim 1, wherein the one adsorption agent regenerates at a lower temperature than the other adsorption agent; and wherein said passing step includes conducting the regeneration gases first through the other adsorption agent and then through the one adsorption agent so that the temperature of the regeneration gases is reduced during the regeneration of the other adsorption agent to a level sufficient for regenerating the one adsorption agent, prior to reaching the latter.

3. The method of claim 2; and further comprising the step of adding a gas at a temperature below that of the regeneration gases leaving the other adsorption agent, to the latter prior to reaching the one adsorption agent, to further reduce the temperature of the gases passing through the one adsorption agent.

4. The method of claim 1, wherein the admission of said first quantity into said first zone is effected separately from and substantially independently of the admission of said second quantity into said second zone.

5. The method of claim 1, wherein the removal of the regenerated first quantity from said first zone is effected separately from and substantially independently of the withdrawal of the regenerated second quantity from said second zone.

* * * * *